UNITED STATES PATENT OFFICE.

JOSEPH C. TILTON, OF PITTSBURG, PENNSYLVANIA.

IMPROVED SOAP COMPOUND.

Specification forming part of Letters Patent No. 42,806, dated May 17, 1864.

*To all whom it may concern:*

Be it known that I, JOSEPH C. TILTON, of the city of Pittsburg, in the county of Allegheny and State of Pennsylvania, have invented a new and useful Compound for Making Soap; and I hereby declare that the following is a full, clear, and exact description of the materials used and the proportions in combining the same.

The nature of my invention consists in mixing together certain well-known ingredients used in the manufacture of soap with spirits of petroleum or benzine in such proportions as to form a pasty mass of such consistency and strength that two pounds of said compound, when added to two gallons of hot water, will make that quantity of good white soft soap, possessing powerful detergent qualities, and yet perfectly harmless to the finest description of colored goods.

To enable others skilled in the art to compound and make the same, I will proceed to name the ingredients, the proportions used, and the manner of combining them.

To make my improved compound, take eight ounces of sal-soda and four ounces of pulverized alum, which are to be boiled in just sufficient water to dissolve them. This being done, one pound of finely cut or shaved German erasive soap is to be added, and, while hot, put in one ounce of spirits of turpentine, half an ounce of spirits of camphor, one ounce of spirits of petroleum or benzine, half an ounce of sassafras or bergamot, and when nearly cold add one ounce of spirits of hartshorn or ammonia, the whole to be inclosed in an air-tight vessel as soon as the ammonia is poured in, and there kept until required for use.

The above-mentioned compound, on being dissolved in one gallon of boiling water, will make, when cold, ten pounds of fine white hard soap; or, by the addition of another gallon and a half of water, twenty-four pounds of superior soft soap is the result.

Color may be given to the hard soap by the addition of a small quantity of vermilion or artificial ultramarine, mixed with the melted mass before cooling.

The object of my invention is to form a compound that can be packed and sold in air-tight cans containing from one to several pounds each, and of sufficient strength to make soap by the addition of hot water in the manner hereinbefore stated, to enable persons to make their own soap (and of a superior quality) at a mere nominal cost, requiring but little labor.

Having thus described my invention, what I claim is—

A soap compound prepared of the ingredients hereinbefore mentioned, when combined in the proportions and manner substantially as herein set forth.

JOSEPH C. TILTON.

Witnesses:
   JOSIAH W. ELLS,
   EB. WILLIAMS, Jr.